United States Patent
Liu et al.

(10) Patent No.: US 7,548,578 B2
(45) Date of Patent: Jun. 16, 2009

(54) DIGITAL FREQUENCY HOPPING TRANSCEIVER AND METHOD THEREOF

(75) Inventors: Der Zheng Liu, Tainan (TW); Kuo Ming Wu, Nantou (TW); Kuang Yu Yen, Taichung (TW)

(73) Assignee: Realtek Semiconductor Corp., HsinChu (TW)

( * ) Notice: Subject to any disclaimer, the term of this patent is extended or adjusted under 35 U.S.C. 154(b) by 601 days.

(21) Appl. No.: 11/230,477

(22) Filed: Sep. 21, 2005

(65) Prior Publication Data

US 2006/0062279 A1 Mar. 23, 2006

(30) Foreign Application Priority Data

Sep. 23, 2004 (TW) .............................. 93128794 A

(51) Int. Cl.
*H04B 1/00* (2006.01)
(52) U.S. Cl. ..................... 375/133; 375/132; 375/136
(58) Field of Classification Search ................ 375/132, 375/133, 136
See application file for complete search history.

(56) References Cited

U.S. PATENT DOCUMENTS 6,195,383 B1 * 2/2001 Wishart et al. ............... 375/136
6,788,729 B1 * 9/2004 Posti ........................... 375/133

\* cited by examiner

*Primary Examiner*—Juan A Torres
(74) *Attorney, Agent, or Firm*—Winston Hsu

(57) ABSTRACT

The digital frequency-hopping (FH) transceiver and the method thereof can be applied to FH communication system with a short FH time. The transceiver employs a digital signal processing (DSP) in baseband (BB) circuits to implement FH without need to adjusting the RF carrier frequency. Wherein, the digital FH transmitter performs DSP on a digital BB transmission signal to frequency-hop between BB sub-bands corresponding to sub-bands of a channel, converts it into an analog signal, and then modulates the analog signal to the channel sub-bands for transmission. The digital FH receiver then performs carrier demodulation, analog-to-digital conversion and DSP on a received signal to regain the original digital BB transmission signal.

12 Claims, 9 Drawing Sheets

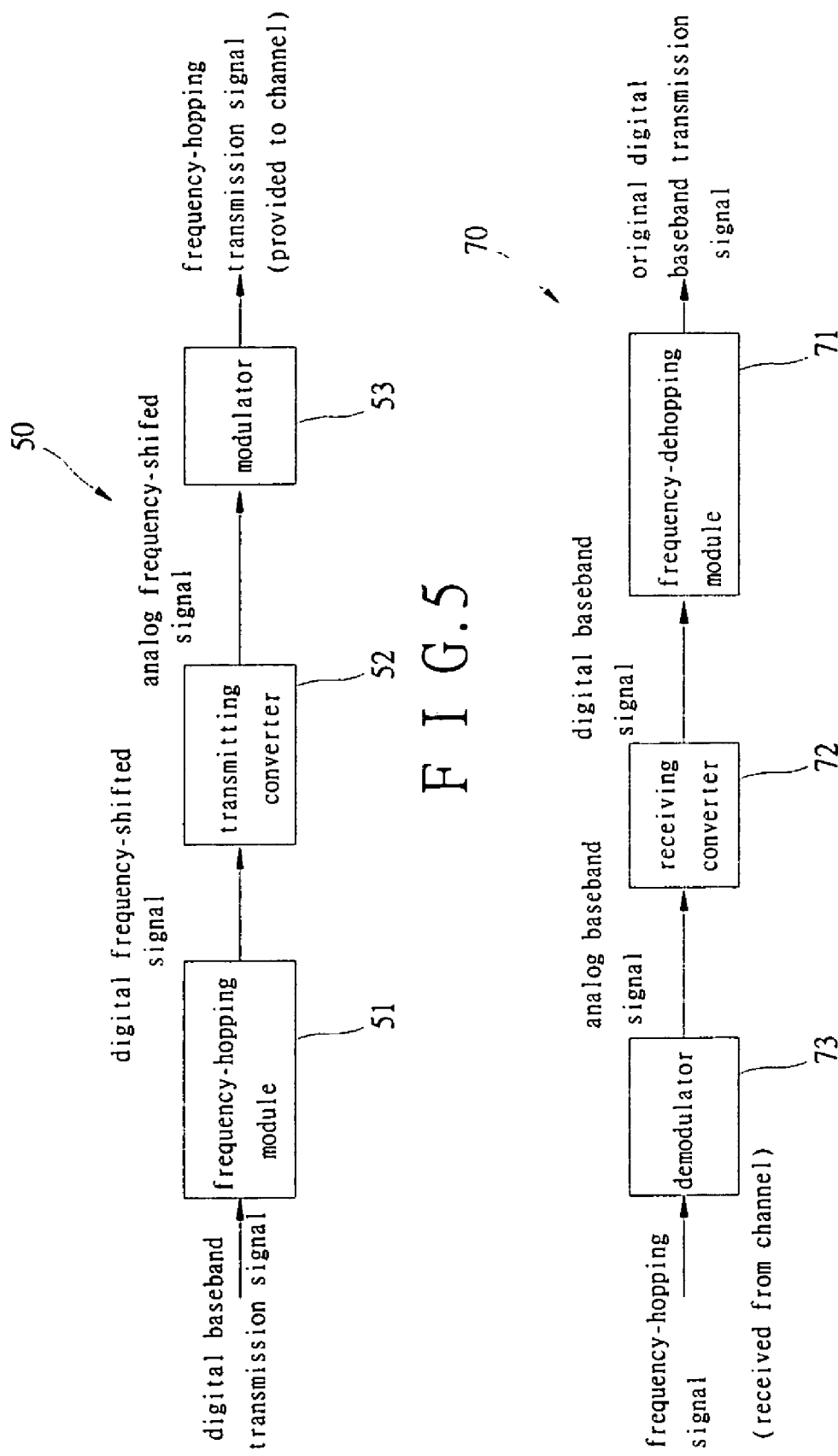

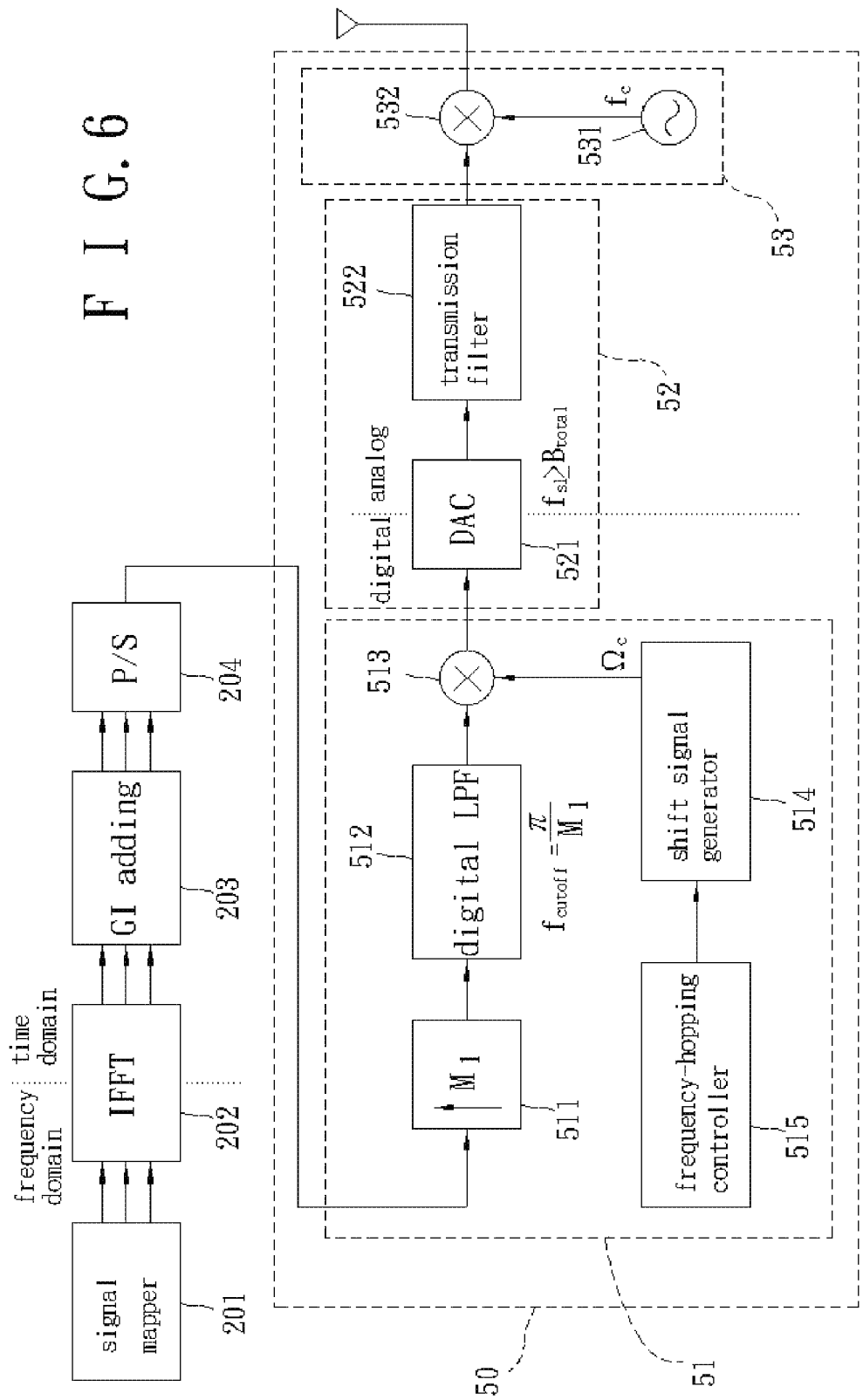

US 7,548,578 B2

DIGITAL FREQUENCY HOPPING TRANSCEIVER AND METHOD THEREOF

BACKGROUND OF THE INVENTION (a). Field of the Invention

This invention relates to a communication system, and more particularly, to the frequency hopping transceiver of the communication system.

(b). Description of the Prior Arts

Frequency-hopping (FH) communication system is a commonly used technique. One of the examples is the multi-band orthogonal frequency division multiplexing (MB-OFDM) system. The MB-OFDM system hops between three adjacent sub-bands in the channel, as shown in FIG. 1. In FIG. 1, $f_{c1}$, $f_{c2}$, $f_{c3}$ are the central frequencies of the three adjacent sub-bands. B stands for a symbol rate of the MB-OFDM system (i.e., the bandwidth of the OFDM signal). $T_{OFDM}$ stands for a symbol interval. The OFDM signal frequency-hops to another sub-band every symbol interval in accordance with a specific sequence.

In prior art, a frequency-hopping controller within a baseband circuit of the transmitter is used to control the frequency of a carrier signal generated by a carrier frequency synthesizer, and the baseband signal can be modulated according to the carrier frequency for transmission. In the baseband circuit of a conventional receiver, a packet detector is used to detect if a packet has been received. If the packet is detected, it will activate the frequency-hopping controller to sequentially output a frequency-hopping control signal to the carrier frequency synthesizer, and the carrier frequency synthesizer will then output the carrier signal. The received radio frequency (RF) signal will be demodulated according to the carrier frequency to produce the original baseband signal.

Please refer to FIG. 2. FIG. 2 is a block diagram of the conventional transmitter of the MB-OFDM system. A signal mapper 201 converts an input into a mapped signal. An inverse fast Fourier transform (IFFT) device 202 is used for converting the mapped signal into a time-domain signal. A guard interval (GI) adding circuit 203 is used for adding the time-domain signal with a guard interval and then generating a baseband OFDM signal. The baseband OFDM signal is converted into an analog signal by a parallel-to-serial converter (P/S) 204 and a digital-to-analogue converter (DAC) 205. The sampling frequency $f_s$ of the DAC 205 is $$f_s \geq \frac{1}{T_{OFDM}} = B$$

This analog signal will pass through a transmission filter 206, in which the cutoff frequency (marked as $f_{cutoff}$) is B/2. A frequency-hopping controller 209 controls the frequency of the oscillating signal of a frequency synthesizer 208, and a mixer 207 modulates the analog signal according to the frequency of the oscillating signal to produce a RF signal. As shown in FIG. 1, the carrier frequency output by the frequency synthesizer 208 is $f_c = f_{c1}, f_{c2},$ or $f_{c3}$ In which, $f_{c2} - f_{c1} = B$ and $f_{c3} - f_{c2} = B$.

Please refer to FIG. 3, which shows a block diagram of the conventional receiver of the MB-OFDM system. The frequency of an oscillating signal of a frequency synthesizer 308 is first set at an initial frequency (one of $f_{c1}$, $f_{c2}$ and $f_{c3}$) A mixer 307 is used for demodulating a received RF signal according to the frequency of the oscillating signal into a baseband signal that will then pass through a low pass filter (LPF) 306 with a cutoff frequency of B/2. After the filtered baseband signal is sampled by an analog-to-digital converter (ADC) 305, the sampled signal is monitored by a packet detector 310 to set appropriate frequency-hopping time points. The frequency synthesizer 308 outputs different carrier frequencies according to the appropriate frequency-hopping time point controlled by a frequency-hopping controller 309. On the other hand, the sampled signal from the ADC 305 passes through a GI removing circuit 303 and a serial-to-parallel converter (S/P) 304, and then enters a fast Fourier transform (FFT) device 302 to be converted into a frequency-domain signal. After the compensation of a channel compensation device 311, a signal-demapping circuit 301 is used to generate the originally transmitted signal.

However, due to the very short frequency-hopping time stipulated by the MB-OFDM system, the frequency-hopping mechanism needs a very fast reaction rate. Also, as shown in FIG. 4, when the previously described mechanism is used for frequency hopping, transient impairment may happen to damage the performance of the MB-OFDM system. In FIG. 4, we can see that $T_{FH}$ is relatively smaller than $T_{GI}$ and $T_{FFT}$ within a symbol interval $T_{OFDM}$. This means the time provided for frequency hopping is shorter. Therefore, the transient impairment is easy to happen in the transmitting signal within the period of $T_{FH}$.

Moreover, in the receiver as shown in FIG. 3, if the packet detector 310 unfortunately makes a mistake, or the frequency-hopping controller 309 makes a wrong decision, it is very possible to lose signal due to improper setting of the frequency-hopping time point. This will cause unrecoverable continuous mistakes and damage the performance of the MB-OFDM system seriously.

SUMMARY OF THE INVENTION

It is therefore one of objectives of this invention to provide a digital frequency-hopping transceiver and a method thereof to resolve the above-mentioned problem.

According to an embodiment of this invention, a transmitting method used in a frequency-hopping communication system is provided. The frequency-hopping communication system hops between N sub-bands of a channel for signal transmission (N>1). The transmitting method comprises: generating a digital frequency-shifted signal according to a digital baseband signal, wherein the digital frequency-shifted signal comprises information of the digital baseband signal and hops between N baseband sub-bands corresponding to the N sub-bands of the channel; converting the digital frequency-shifted signal into an analog frequency-shifted signal; modulating the analog frequency-shifted signal into a frequency-hopping transmission signal; and transmitting the frequency-hopping transmission signal through the N sub-bands of the channel.

According to an embodiment of this invention, a receiving method used in a frequency-hopping communication system is provided. The frequency-hopping communication system comprises a transmitter, which converts a baseband transmitting signal into a frequency-hopping signal and transmits the frequency-hopping signal to a receiver through a channel comprising N sub-bands. The receiving method comprises: demodulating the frequency-hopping signal into an analog baseband signal according to an oscillation frequency; converting the analog baseband signal into a digital baseband signal; and generating a baseband receiving signal according to frequency dehopping of the digital baseband signal, wherein the baseband receiving signal comprises information of the baseband transmitting signal.

BRIEF DESCRIPTION OF THE DRAWINGS

FIG. 5 illustrates a block diagram of an embodiment of a frequency-hopping transmitter according to the present invention.

FIG. 6 is a block diagram of a preferred embodiment of the frequency-hopping transmitter according to the present invention.

FIG. 7 is a block diagram of an embodiment of a frequency-hopping receiver according to the present invention.

DETAILED DESCRIPTION OF THE INVENTION

Figure 1:
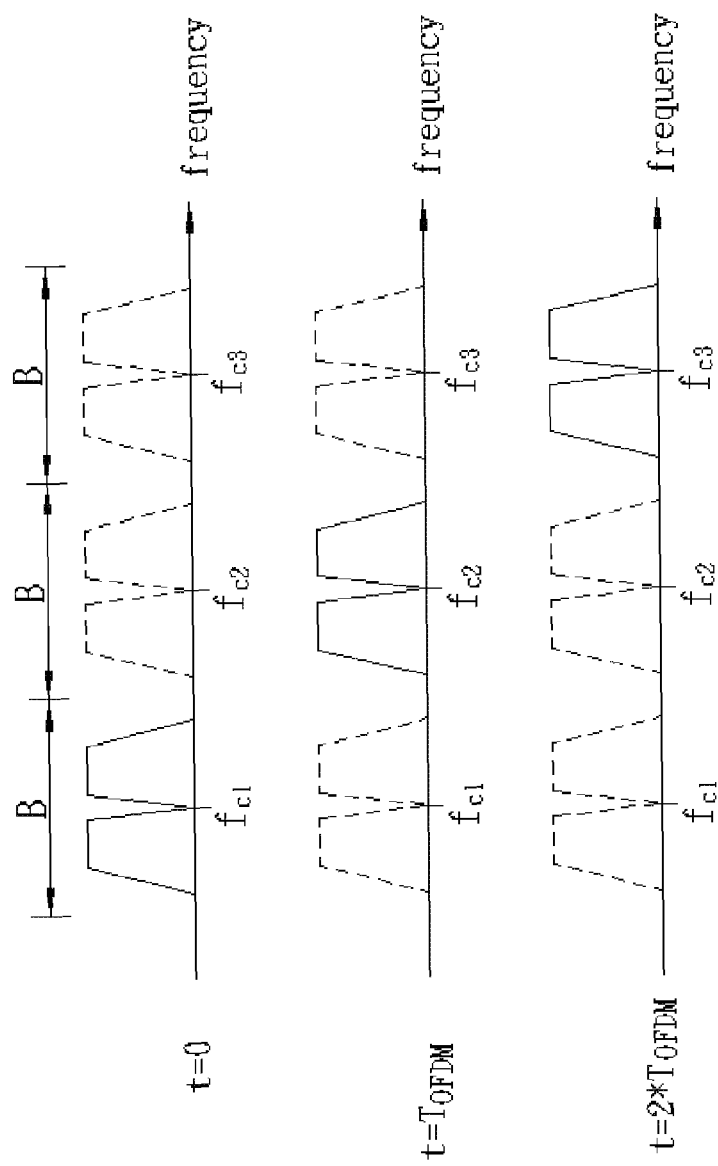
FIG. 1 illustrates a diagram of frequency-hopping mechanism of the MB-OFDM system.

For easier narration, the frequency-hopping communication system mentioned in all embodiments of this section hops between N sub-bands of a channel for signal transmission (N>1), and is described as the MB-OFDM system. However, the present invention is not limited thereto.

FIG. 5 illustrates a block diagram of an embodiment of a frequency-hopping transmitter 50 according to the present invention. The frequency-hopping transmitter 50 includes a frequency-hopping module 51, a transmitting converter 52 and a modulator 53, as shown in FIG. 5. The frequency-hopping module 51 generates a digital frequency-shifted signal, which hops between N first baseband sub-bands, according to a digital baseband transmission signal. The digital frequency-shifted signal keeps the information of the digital baseband transmission signal, and the N first baseband sub-bands have a corresponding relationship with the N sub-bands of the channel. The transmitting converter 52 is coupled to the frequency-hopping module 51, and converts the digital frequency-shifted signal into an analog frequency-shifted signal. The modulator 53 is coupled to the transmitting converter 52, and modulates the analog frequency-shifted signal according to a carrier frequency into a frequency-hopping transmission signal, which is then transmitted by an antenna. The frequency-hopping transmission signal hops among the N sub-bands of the channel according to a frequency-hopping sequence of the digital frequency-shifted signal.

FIG. 6 illustrates a more detailed block diagram of the frequency-hopping transmitter 50 of this invention. As shown in FIG. 6, the frequency-hopping transmitter 50 is located in the transmitter of the frequency-hopping communication system. The transmitting converter 52 includes a DAC 521, which receives the digital frequency-shifted signal from the frequency-hopping module 51 and converts it into an analog signal. In order that the bandwidth of the analog signal can cover the whole variable frequency range, the sampling frequency $f_{s1}$ of the DAC 521 has to be at least the difference $B_{total}$ of the highest frequency and the lowest frequency of the N sub-bands of the channel. The transmitting converter 52 also includes a transmission filter 522 that filters the analog signal output by the DAC 521 to generate the analog frequency-shifted signal. In a preferred embodiment, the transmission filter 522 is a low-pass filter, which has a cut-off frequency in between $B_{total}/2$ and $f_{s1}-B_{total}/2$ to prevent from the aliasing effect and signal distortion.

The frequency-hopping module 51 includes a frequency up-converter 511, a digital low-pass filter 512, a shift signal generator 514, a multiplier 513 and a frequency-hopping controller 515. As mentioned earlier about FIG. 2, the signal to be transmitted will become a baseband signal (i.e., the digital baseband transmission signal as shown in FIG. 5) after being processed by the circuit blocks 201 to 204. The frequency up-converter 511 will then up-convert the baseband signal into an up-converted signal according to an up-converting factor $M_1$ (i.e., insert ($M_1$-1) zeros in between any two sampling points). The low-pass filter 512 will filter the up-converted signal and produce a filtered signal. In a preferred embodiment, $M_1$ is equal to $f_{s1}/B$ and the cut-off frequency of the low-pass filter 512 is $\pi/M_1$, in which, B is the Symbol Rate of the communication system. One objective for the selection of the up-converting factor $M_1$ and the cut-off frequency of the low-pass filter 512 is to extend the frequency range that the digital frequency spectrum (i.e., from $-\pi$ to $\pi$) can represent, such that digital signal processing (DSP) can be applied for frequency hopping. Another objective is to keep the bandwidth of the analog frequency-shifted signal, which is produced after digital-to-analog conversion, at the Symbol Rate B.

The shift signal generator 514 produces N transmission shift signals corresponding to the N first baseband sub-bands. The frequency-hopping controller 515, coupled to the shift signal generator 514, selects one of the N transmission shift signals according to a predetermined sequence, and outputs the selected transmission shift signal. The multiplier 513 receives the filtered signal from the low-pass filter 512 and the selected transmission shift signals from the shift signal generator 514, and then sequentially shifts the filtered signal to each corresponding first baseband sub-band, thereby producing the digital frequency-shifted signal that hops among the N first baseband sub-bands. The hopping sequence of the digital frequency-shifted signal is set up in accordance with the need of the communication system, and there are no other limitations. In a preferred embodiment, the channel of the communication system includes N adjacent sub-bands. Every sub-band has a bandwidth of B, and therefore, $B_{total}=N\times B$. If the sampling frequency $f_{s1}$ is set as NB, then the cut-off frequency of the transmission filter 522 is NB/2, $M_1=N$, and the N transmission shift signals produced by the shift signal generator 514 can be $$c_n = e^{j2\pi\Omega_c n}$$

In which, $\Omega_c = -\frac{(N-1)}{2N}, -\frac{(N-3)}{2N}, \ldots, \frac{(N-3)}{2N}, \frac{(N-1)}{2N}$ In the embodiment of FIG. 6, the modulator 53 includes a local oscillator 531 and a mixer 532. The oscillation frequency of the local oscillator 531 is determined according to the corresponding relationship of the N first baseband sub-bands and the N sub-bands of the channel as mentioned before. In this embodiment, the N sub-bands and the corresponding N first baseband sub-bands are each distanced by a frequency shift amount. The frequency shift amount equals the central frequency $f_c$ of the channel; therefore, the oscillation frequency is set as $f_c$. The mixer 532 modulates the analog frequency-shifted signal output by the transmitting converter 52 into the frequency-hopping transmission signal mentioned above according to the oscillating frequency of the local oscillator 531. The frequency-hopping transmission signal is then transmitted through the antenna.

FIG. 7 illustrates a block diagram of an embodiment of a frequency-hopping receiver 70 according to this invention. Both the frequency-hopping receiver 70 and the frequency-hopping transmitter 50 in FIG. 5 can be used in the same frequency-hopping communication system, thereby restoring the frequency-hopping transmission signal transmitted through the channel by the frequency-hopping transmitter 50 back to the original digital baseband transmission signal. As shown in FIG. 7, the frequency-hopping receiver 70 includes a frequency-dehopping module 71, a receiving converter 72 and a demodulator 73. The demodulator 73 can demodulate the frequency-hopping transmission signal received from the channel into an analog baseband signal. The receiving converter 72 is coupled to the demodulator 73, and converts the analog baseband signal into a digital baseband signal. This digital baseband signal retains the information of the frequency-hopping transmission signal and hops among N second baseband sub-bands, in which the N second baseband sub-bands have a corresponding relationship with the N sub-bands of the channel. The frequency-dehopping module 71 can receive the digital baseband signal from the receiving converter 72, and perform digital signal processing thereon (including performing the frequency dehopping for the digital baseband signal), thereby restoring the original digital baseband transmission signal.

Figure 8:
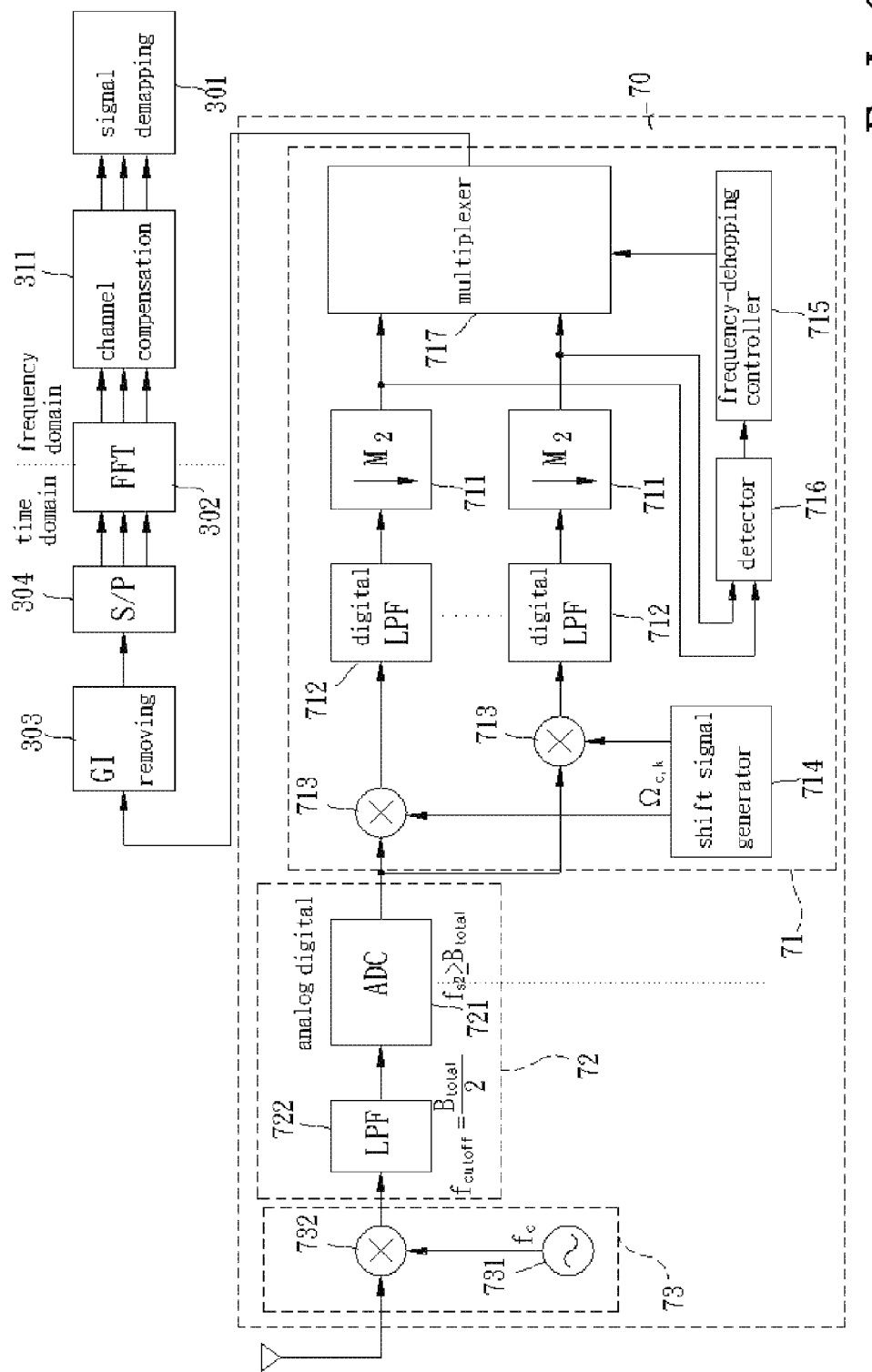
FIG. 8 is a block diagram of a preferred embodiment of the frequency-hopping receiver according to the present invention.

FIG. 8 illustrates a block diagram of a preferred embodiment of the frequency-hopping receiver 70 of this invention. As shown in FIG. 8, the frequency-hopping receiver 70 is located in the receiver of the MB-OFDM system. The demodulator 73 includes a local oscillator 731 and a mixer 732. The oscillation frequency of the local oscillator 731 is determined by the corresponding relationship of the N second baseband sub-bands and the N sub-bands of the channel. In the embodiment of FIG. 8, the N sub-bands and the corresponding second baseband sub-bands are each distanced by a frequency shift amount. The frequency shift amount equals the central frequency $f_c$ of the channel, and therefore, the oscillation frequency is set as $f_c$. The mixer 732 is coupled to the local oscillator 731 and the receiving converter 72, and demodulates the received frequency-hopping transmission signal into the analog baseband signal according to the oscillation frequency of the local oscillator 731.

In the embodiment of FIG. 8, the receiving converter 72 includes a low-pass filter 722 which filters the analog baseband signal from the mixer 732. The receiving converter 72 also includes an ADC 721, which converts the filtered analog baseband signal into the digital baseband signal shown in FIG. 7. The sampling frequency $f_{s2}$ of the ADC 721 has to be at least the difference $B_{total}$ of the highest frequency and the lowest frequency of the N sub-bands of the channel, so that the converted digital signal bandwidth (i.e., from $-\pi$ to $\pi$) can cover the whole variable frequency range of the communication system. Since the mixer 732 performs signal demodulation according to the central frequency $f_c$, the cutoff frequency of the low-pass filter 722 can be set as $B_{total}/2$, thereby filtering out the noise that does not belong to the variable frequency range of the communication system.

In the embodiment of FIG. 8, the frequency-dehopping module 71 includes a shift signal generator 714, N multipliers 713, N digital low-pass filters 712, N frequency down-converters 711, a detector 716, a frequency-dehopping controller 715 and a multiplexer 717. The shift signal generator 714 can generate N reception shift signals corresponding to N second baseband sub-bands. The digital baseband signal output by ADC 721 is applied to N routes, each sent into one of the N multipliers 713 and multiplied by one of the N reception shift signals. Each of the N digital low-pass filters 712 is individually coupled to one of the N multipliers 713, and filters the output result of the corresponding multiplier 713 to generate a filtered signal. The cutoff frequency of the N digital low-pass filters 712 is $\pi/M_2$, wherein $M_2$ equals to $f_{s2}/B$. Each of the N frequency down-converters 711 is individually coupled to one of the N digital low-pass filters 712, and down-converts one of the N filtered signals according to a down-converting factor $M_2$ and then outputs a down-converted signal. In one embodiment, the channel of the MB-OFDM system includes N adjacent sub-bands. The bandwidth of each sub-band is B, and therefore, $B_{total}=N \times B$. If the sampling frequency $f_{s2}$ of the ADC 721 is set as NB, then $M_2=N$, and the N reception shift signals produced by the shift signal generator 714 can be $$c_{n,k} = e^{-j2\pi\Omega_{c,k}n}$$

In which, $\Omega_{c,k} = -\frac{1}{2} + \frac{2k+1}{2N}, k = 0, 1, \ldots, N-1.$ The digital baseband signal that originally hops among the N second baseband sub-bands will be frequency-dehopped after the digital signal processing (including frequency shifting, filtering, and down-converting) mentioned above, and will return to the original digital baseband transmission signal (i.e., the baseband OFDM signal in this embodiment), which can be collected from the N down-converted signals. The detector 716 is coupled to each frequency down-converter 711 to detect the down-converted signals that form the original digital baseband transmission signal. The frequency-dehopping controller 715 is coupled to the detector 716, and generates a frequency-dehopping control signal according to the result of detection. The multiplexer 717 is coupled to the N frequency down-converters 711, and sequentially selects one of the N frequency down-converters 711 according to the frequency-dehopping control signal, thereby outputting the digital baseband transmission signal. In one embodiment, the detector 716 is a packet detector, which will set up an appropriate frequency-hopping time point when a packet is detected, and will then activate the frequency-dehopping controller 715 to output the frequency-dehopping control signal according to a predetermined frequency-hopping sequence of the system. Lastly, after the restored digital baseband transmission signal sequentially passes through the circuit blocks 303, 304, 302, 311 and 301, the original signal transmitted by the system transmitter can be obtained. This part of signal processing is similar to the like part of FIG. 3, and will not be described again here.

Figure 2:
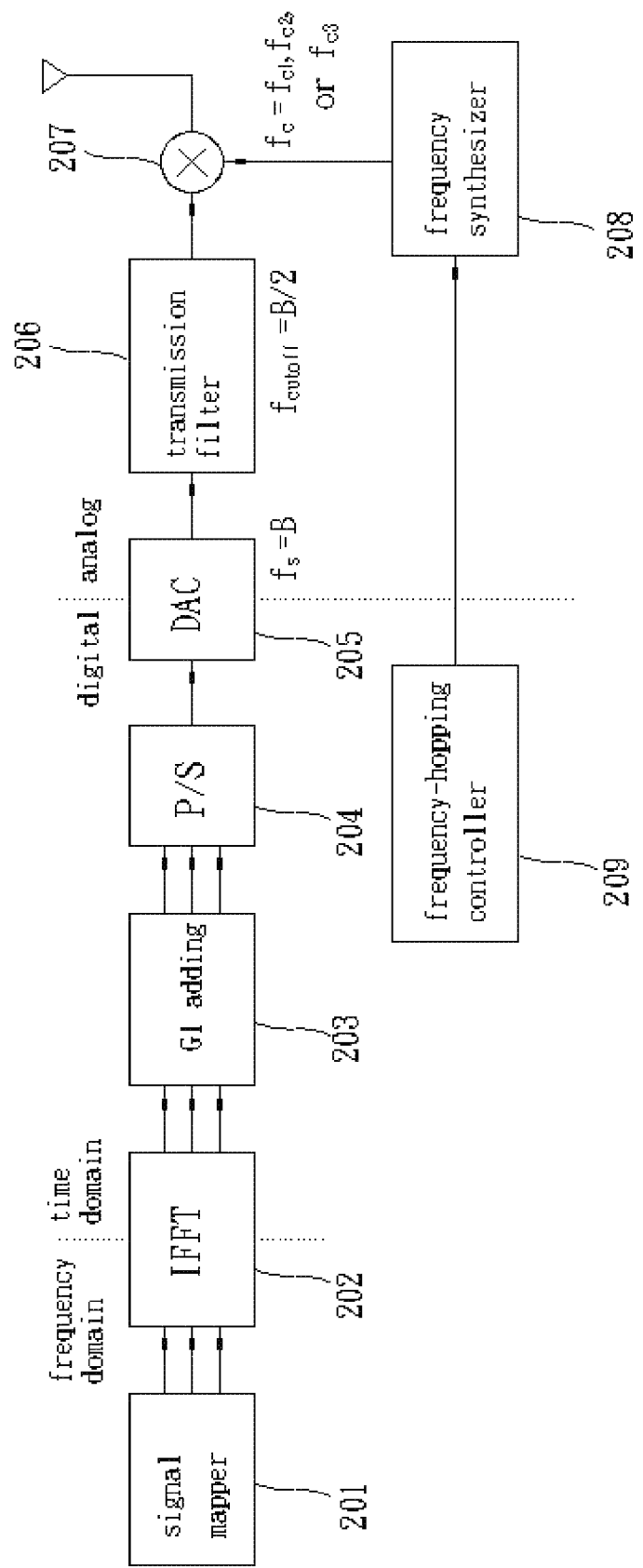
FIG. 2 illustrates a block diagram of the conventional transmitter of the MB-OFDM system.
Figure 3:
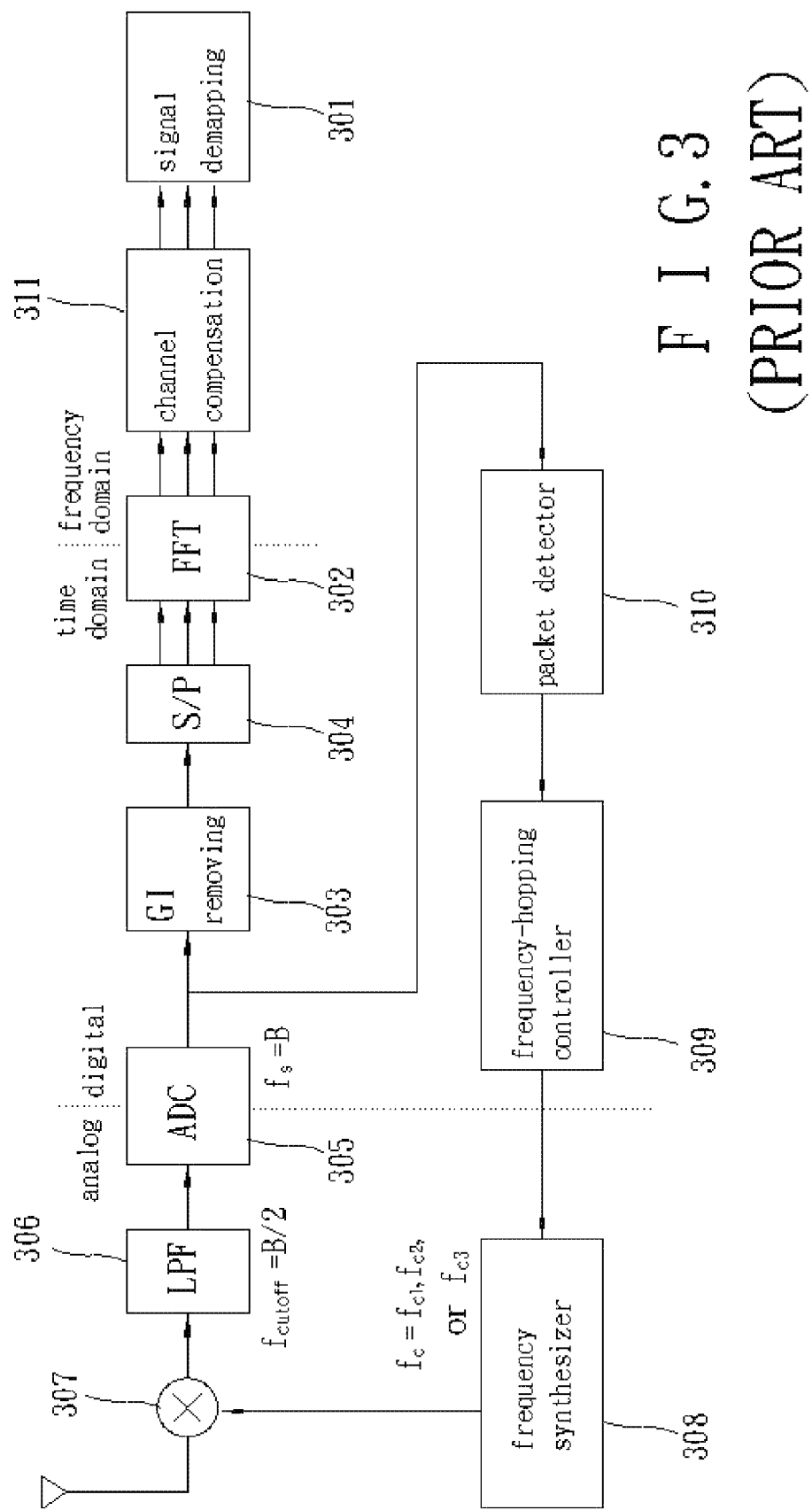
FIG. 3 illustrates a block diagram of the conventional receiver of the MB-OFDM system.
Figure 4:
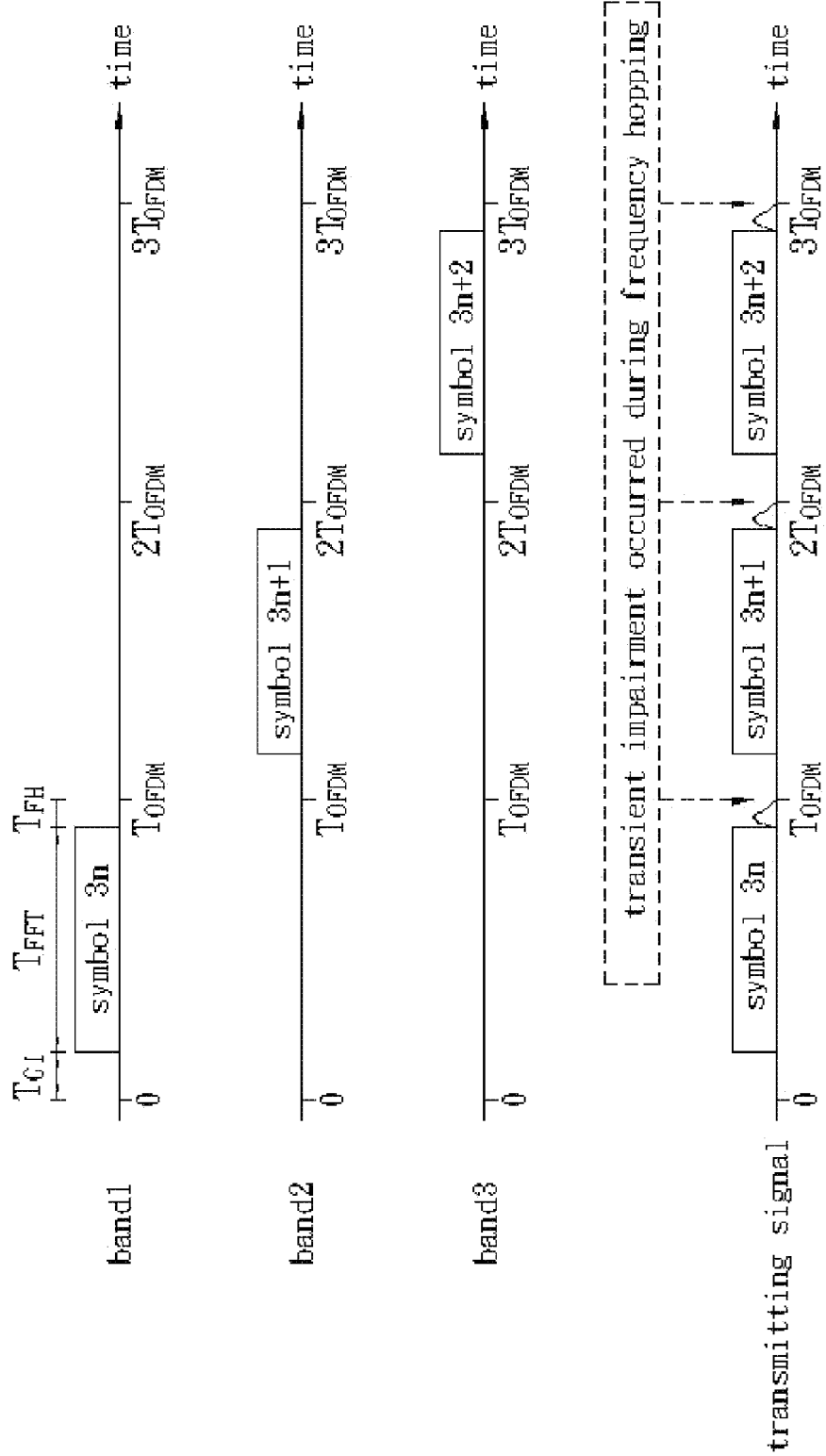
FIG. 4 illustrates transient impairment generated during frequency hopping by the conventional technology.

In another embodiment, the frequency-hopping transmitter 50 in FIG. 5 and the frequency-hopping receiver 70 in FIG. 7 can be used separately. For example, the embodiment of the system transmitter shown in FIG. 6 can be used together with the conventional receiver as shown in FIG. 3. Also, the embodiment of the system receiver shown in FIG. 8 can be used together with the conventional transmitter as shown in FIG. 2.

Figure 9:
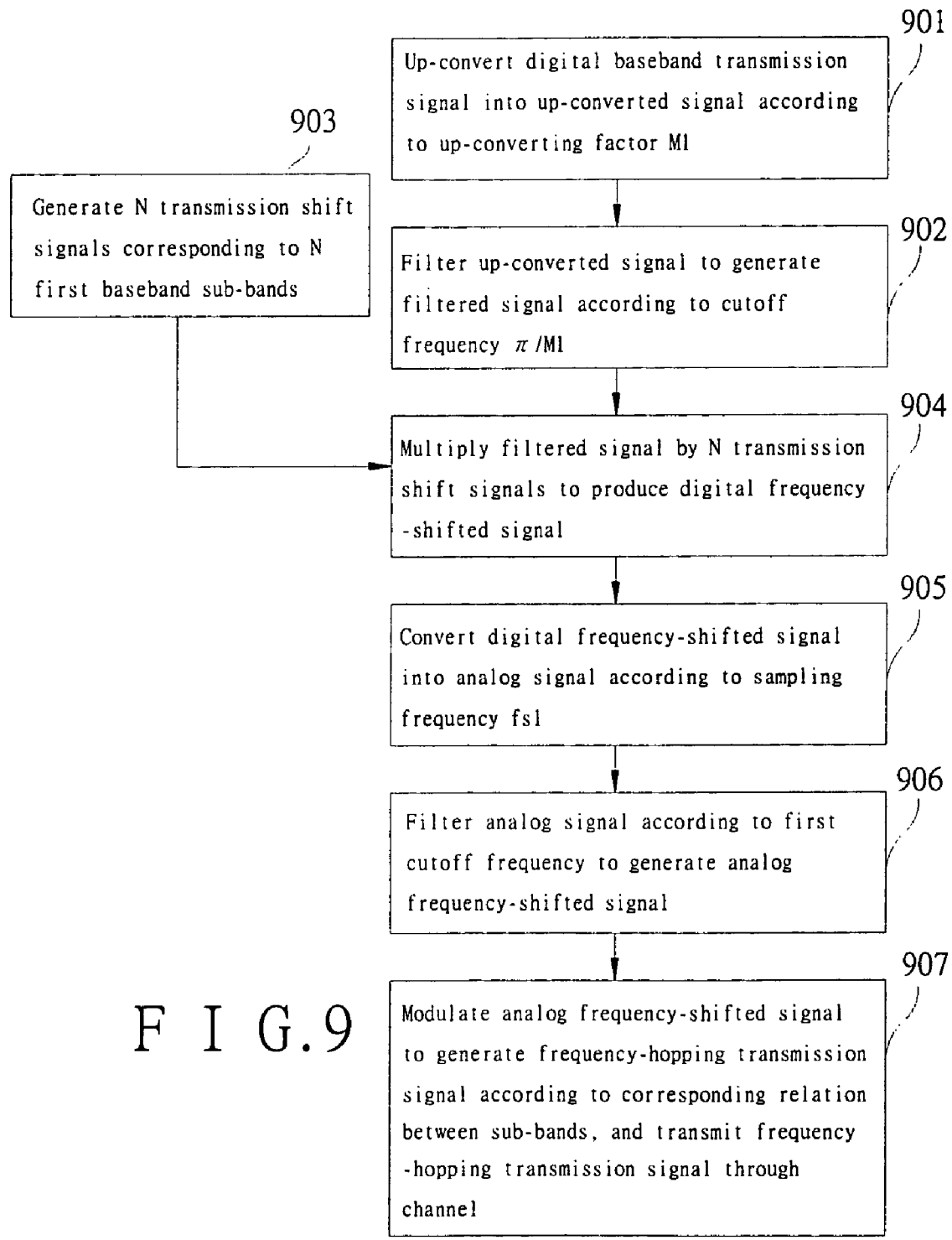
FIG. 9 is a flowchart of an embodiment of the frequency-hopping transmitting method according to the present invention.

FIG. 9 is a flowchart of a preferred embodiment of the frequency-hopping transmitting method according to the present invention. The flow corresponds to the frequency-hopping transmitter 50 in FIG. 6, and comprises the following steps:

Step 901: Up-converting a digital baseband transmission signal to output an up-converted signal according to an up-converting factor $M_1$;

Step 902: Filtering the up-converted signal to generate a filtered signal according to a cutoff frequency $\pi/M_1$;

Step 903: Generating N transmission shift signals corresponding to N first baseband sub-bands, wherein the N first baseband sub-bands are corresponding to the N sub-bands of the channel;

Step 904: Multiplying the filtered signal by the N transmission shift signals to shift the filtered signal to the corresponding first baseband sub-bands, thereby producing a digital frequency-shifted signal;

Step 905: Converting the digital frequency-shifted signal into an analog signal according to a sampling frequency $f_{s1}$, wherein the sampling frequency $f_{s1}$ is not smaller than $B_{total}$;

Step 906: Filtering the analog signal according to a first cutoff frequency to generate an analog frequency-shifted signal, wherein the first cutoff frequency is between $B_{total}/2$ and $f_{s1}-B_{total}/2$; and Step 907: Modulating the analog frequency-shifted signal to generate a frequency-hopping transmission signal according to the corresponding relation between the sub-bands, and transmitting the frequency-hopping transmission signal through the channel.

Figure 10:
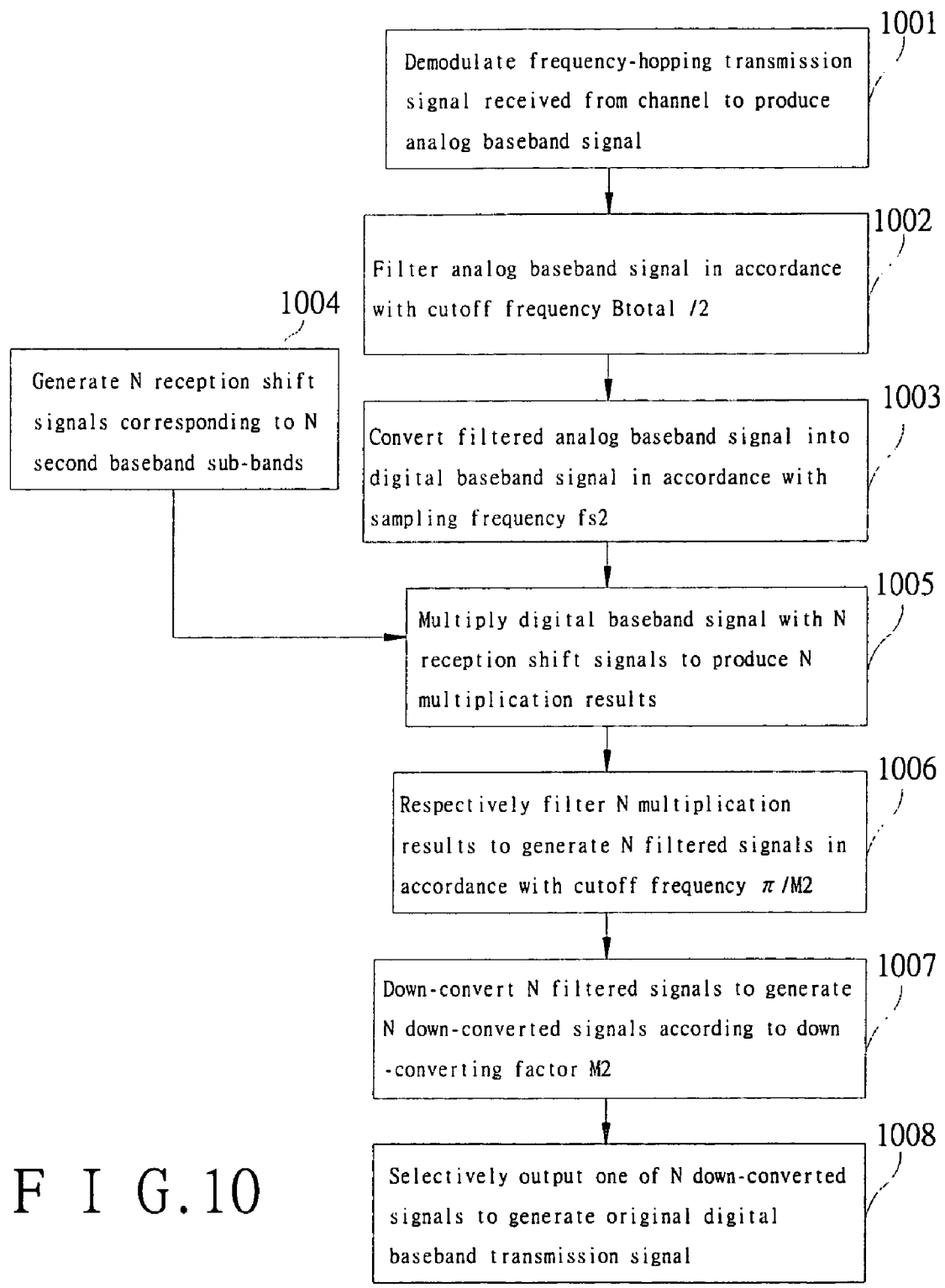
FIG. 10 is a flowchart of an embodiment of the frequency-hopping receiving method according to the present invention.

FIG. 10 is a flowchart of a preferred embodiment of the frequency-hopping receiving method according to this invention. The flow corresponds to the frequency-hopping receiver 70 in FIG. 8, and comprises the following steps:

Step 1001: Demodulating a frequency-hopping transmission signal received from the channel to produce an analog baseband signal;

Step 1002: Filtering the analog baseband signal in accordance with a cutoff frequency $B_{total}/2$;

Step 1003: Converting the filtered analog baseband signal into a digital baseband signal in accordance with a sampling frequency $f_{s2}$;

Step 1004: Generating N reception shift signals that correspond to N second baseband sub-bands;

Step 1005: Multiplying the digital baseband signal with the N reception shift signals to produce N multiplication results;

Step 1006: Respectively filtering the N multiplication results to generate N filtered signals in accordance with a cutoff frequency $\pi/M_2$;

Step 1007: Down-converting the N filtered signals to generate N down-converted signals according to a down-converting factor $M_2$; and Step 1008: Selectively outputting one of the N down-converted signals to generate the original digital baseband transmission signal.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A receiver, used in a frequency-hopping communication system comprising a transmitter which converts a baseband transmitting signal into a frequency-hopping signal and transmits the frequency-hopping signal to the receiver through a channel comprising N sub-bands, for receiving the frequency-hopping signal, the receiver comprising:
a demodulator for demodulating the frequency-hopping signal into an analog baseband signal according to an oscillation frequency;
a converter, coupled to the demodulator, for converting the analog baseband signal into a digital baseband signal; and
a frequency-dehopping module, coupled to the converter, for generating a baseband receiving signal according to the digital baseband signal, wherein the baseband receiving signal comprises information of the baseband transmitting signal;
wherein the frequency-dehopping module comprises:
a shift signal generator for generating N shift signals corresponding to the N sub-bands;
N multipliers, coupled to the ADC and the shift signal generator, for multiplying the digital baseband signal with the N shift signals respectively;
N frequency down-converters, each frequency down-converter, coupled to the corresponding multiplier, for down-converting an output of the corresponding multiplier to generating a down-converted signal according to a down-converting factor M; and
a selector, coupled to the N frequency down-converters, for selectively outputting one of the N down-converted signals from the N frequency down-converters to generate the baseband receiving signal.

2. The receiver of claim 1, wherein the demodulator comprises:
an oscillator for generating an oscillation signal having the oscillation frequency; and
a mixer, coupled to the oscillator, for generating the analog baseband signal according to the frequency-hopping signal and the oscillation signal.

3. The receiver of claim 1, wherein the converter comprises:
an analog-to-digital converter (ADC) for converting the analog baseband signal into the digital baseband signal;
wherein a sampling frequency $f_s$ of the ADC is determined according to a frequency difference $B_{total}$ between a highest frequency and a lowest frequency of the N sub-bands.

4. The receiver of claim 3, wherein the sampling frequency $f_s$ of the ADC is not smaller than the frequency difference $B_{total}$.

5. The receiver of claim 3, wherein the converter further comprises:
a low-pass filter for filtering the analog baseband signal according to a cutoff frequency, wherein the cutoff frequency is determined according to the $B_{total}$ and an oscillation frequency of an oscillation signal outputted by an oscillator of the demodulator.

6. The receiver of claim 5, wherein the oscillation frequency is approximately a central frequency of the channel and the cutoff frequency is approximately $B_{total}/2$.

7. The receiver of claim 1, wherein the frequency-hopping communication system is a multi-band orthogonal frequency division multiplexing (MB-OFDM) system.

8. A receiving method, used in a frequency-hopping communication system comprising a transmitter which converts a baseband transmitting signal into a frequency-hopping signal and transmits the frequency-hopping signal to a receiver through a channel comprising N sub-bands, for receiving the frequency-hopping signal, the receiving method comprising:

demodulating the frequency-hopping signal into an analog baseband signal according to an oscillation frequency by a demodulator in a receiver of the frequency-hopping communication system;

converting the analog baseband signal into a digital baseband signal by a converter in the receiver; and generating a baseband receiving signal according to frequency dehopping of the digital baseband signal by a frequency-dehopping module in the receiver, wherein the baseband receiving signal comprises information of the baseband transmitting signal;

wherein the step of generating the baseband receiving signal comprises:

generating N shift signals corresponding to the N sub-bands by a shift signal generator in the frequency-dehopping module;

multiplying the digital baseband signal with the N shift signals to produce N multiplication results by N multipliers in the frequency-dehopping module;

down-converting the N multiplication results according to a down-converting factor M to generate N down-converted signals by N frequency down-converters in the frequency-dehopping module; and selectively outputting one of the N down-converted signals to generate the baseband receiving signal by a selector in the frequency-dehopping module.

9. The receiving method of claim 8, wherein the step of converting comprises:

filtering the analog baseband signal to generate a filtered baseband signal according to a first cutoff frequency by a low-pass filter in the converter; and converting the filtered baseband signal into the digital baseband signal according to a sampling frequency $f_s$ by an analog-to-digital converter in the converter;

wherein the sampling frequency $f_s$ is determined according to a frequency difference $B_{total}$ between a highest frequency and a lowest frequency of the N sub-bands, and the first cutoff frequency is determined according to the $B_{total}$ and the oscillation frequency.

10. The receiving method of claim 9, wherein the oscillation frequency is approximately a central frequency of the channel and the first cutoff frequency is approximately $B_{total}/2$.

11. The receiving method of claim 10, wherein the sampling frequency $f_s$ is not smaller than the frequency difference $B_{total}$.

12. The receiving method of claim 9, further comprising:

respectively filtering the N multiplication results according to a second cutoff frequency $\pi/M$ by N digital low-pass filters in the frequency-dehopping module, wherein the value M is determined according to the sampling frequency.

* * * * *